US008861613B2

(12) United States Patent
Eleftheriadis (10) Patent No.: US 8,861,613 B2
(45) Date of Patent: *Oct. 14, 2014

(54) SYSTEMS AND METHODS FOR SIGNALING AND PERFORMING TEMPORAL LEVEL SWITCHING IN SCALABLE VIDEO CODING

(71) Applicant: Vidyo, Inc., Hackensack, NJ (US)

(72) Inventor: Alexandros Eleftheriadis, Tenafly, NJ (US)

(73) Assignee: Vidyo, Inc., Hackensack, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/156,243

(22) Filed: Jan. 15, 2014

(65) Prior Publication Data

US 2014/0133576 A1    May 15, 2014

Related U.S. Application Data

(63) Continuation of application No. 14/072,638, filed on Nov. 5, 2013, now abandoned, which is a continuation of application No. 11/871,612, filed on Oct. 12, 2007, (Continued)

(51) Int. Cl.
| | |
|---|---|
| H04N 11/02 | (2006.01) |
| H04N 19/70 | (2014.01) |
| H04N 21/2662 | (2011.01) |
| H04N 19/44 | (2014.01) |
| H04N 19/61 | (2014.01) |
| H04N 19/31 | (2014.01) |

(52) U.S. Cl.
CPC ... *H04N 19/00533* (2013.01); *H04N 19/00884* (2013.01); *H04N 21/2662* (2013.01); *H04N 19/00781* (2013.01); *H04N 19/0043* (2013.01)
USPC ............. 375/240.25; 375/240.02; 375/240.26

(58) Field of Classification Search
USPC ........................... 375/240.02, 240.25, 240.26
See application file for complete search history.

(56) References Cited

U.S. PATENT DOCUMENTS

| | | | |
|---|---|---|---|
| 6,480,541 | B1 | 11/2002 | Girod et al. |
| 6,646,578 | B1 | 11/2003 | Au |

(Continued)

FOREIGN PATENT DOCUMENTS

| | | |
|---|---|---|
| EP | 1 670 259 | 6/2006 |
| JP | 2005-341075 | 12/2005 |
| JP | 2009-512307 | 3/2009 |

OTHER PUBLICATIONS

Jinzenji, et al., "Scalable Video Conference System Using MPEG-4 ASP/FGS Software Codecs", *The Institute of Electronics, Information and Communication Engineers*, 104(752):55-60 (2005).

(Continued)

*Primary Examiner* — Jason Mattis
(74) *Attorney, Agent, or Firm* — Baker Botts, L.L.P.

(57) ABSTRACT

Media communication systems and methods for media encoded using scalable coding with temporal scalability are provided. Transmitting endpoints include switching information in their transmitted media to indicate if temporal level switching at a decoder can occur at any frame of the transmitted encoded media.

6 Claims, 8 Drawing Sheets

Related U.S. Application Data now Pat. No. 8,594,202, which is a continuation-in-part of application No. PCT/US2006/028365, filed on Jul. 21, 2006, and a continuation-in-part of application No. PCT/US2006/028366, filed on Jul. 21, 2006, and a continuation-in-part of application No. PCT/US2006/061815, filed on Dec. 8, 2006, and a continuation-in-part of application No. PCT/US2006/062569, filed on Dec. 22, 2006, and a continuation-in-part of application No. PCT/US2007/080089, filed on Oct. 1, 2007, and a continuation-in-part of application No. PCT/US2007/062357, filed on Feb. 16, 2007, and a continuation-in-part of application No. PCT/US2007/065554, filed on Mar. 29, 2007, and a continuation-in-part of application No. PCT/US2007/065003, filed on Mar. 27, 2007, and a continuation-in-part of application No. PCT/US2006/028367, filed on Jul. 21, 2006, and a continuation-in-part of application No. PCT/US2007/063335, filed on Mar. 5, 2007.

(60) Provisional application No. 60/829,609, filed on Oct. 16, 2006.

(56) References Cited

U.S. PATENT DOCUMENTS

| | | | |
|---|---|---|---|
| 6,898,313 | B2 | 5/2005 | Li et al. |
| 7,085,401 | B2 | 8/2006 | Averbuch et al. |
| 7,110,605 | B2 | 9/2006 | Marcellin et al. |
| 8,594,202 | B2 * | 11/2013 | Eleftheriadis ............ 375/240.25 |
| 2003/0123546 | A1 | 7/2003 | Falik et al. |
| 2005/0254575 | A1 | 11/2005 | Hannuksela et al. |
| 2006/0153373 | A1 | 7/2006 | Mukherjee |
| 2008/0013620 | A1 | 1/2008 | Hannuksela et al. |
| 2008/0089597 | A1 | 4/2008 | Guo et al. |
| 2008/0095228 | A1 | 4/2008 | Hannuksela et al. |
| 2009/0116562 | A1 | 5/2009 | Eleftheriadis |

OTHER PUBLICATIONS

U.S. Appl. No. 14/072,638, filed Nov. 5, 2013.
U.S. Appl. No. 11/871,612, filed Oct. 12, 2007, Eleftheriadis.
U.S. Appl. No. 11/871,612, Sep. 30, 2013 Issue Fee payment.
U.S. Appl. No. 11/871,612, Sep. 27, 2013 Notice of Allowance.
U.S. Appl. No. 11/871,612, Sep. 11, 2013 Response to Final Office Action.
U.S. Appl. No. 11/871,612, Sep. 6, 2013 Final Office Action.
U.S. Appl. No. 11/871,612, Jul. 12, 2013 Response to Non-Final Office Action.
U.S. Appl. No. 11/871,612, Apr. 24, 2013 Non-Final Office Action.
U.S. Appl. No. 11/871,612, Aug. 23, 2012 Amendment and Request for Continued Examination (RCE).
U.S. Appl. No. 11/871,612, Feb. 23, 2012 Final Office Action.
U.S. Appl. No. 11/871,612, Jan. 6, 2012 Response to Non-Final Office Action.
U.S. Appl. No. 11/871,612, Jul. 6, 2011 Non-Final Office Action.
Wang et al., "Enhancement-layer IDR (EIDR) picture", *Joint Video Team (JVT) of ISO/IEC MPEG & ITU-T VCEG*, 17th Meeting: Nice, France, pp. 1-4, Oct. 2005.
"Joint Draft 7: Scalable Video Coding [Jun. 9, 2008]" ITU Study Group 16—Video Coding Experts Group—ISO/IEC MPEG $ITU-T VCEG (ISO/IEC JTC1/SC29/WG11 and ITU-T SG16 Q60, Document No. JVT_T2001, Sep. 16, 2006, XP030006632; Paragraphs [3.134], [3.142], [G.7.3.2], [G.7.4.3], [G.7.4.4] [G.10].
Eleftheriadis et al., "Clarif Nesting Temporal Levels" ITU Study Group 16—Video Coding Experts Group—ISO/IEC MPEG & ITU-T VCEG (ISO.IEC JTC1/SC29/WG11 and ITU-T SG16 Q6) Document No. JVT-U085, Oct. 26, 2006, XP030006731; Whole document.
Wang Ye-Kui et al., "System and Transport Interface of SVC" IEEE Transactions on Circuits and Systems for Video Technology, IEEE Service Center, Piscataway, NJ, US LNKD-DOI: 10.1109/TCSVT. 2007.906827, vol. 17, No. 9, Sep. 1, 2007, pp. 1149-1163, XP011193022, ISSN: 1051-8215; paragraph [00iv].
Supplemental European Search Report dated Jul. 15, 2010 for European Application No. 07853992.

* cited by examiner

FIG. 1: Communication System

FIGS. 2a-2c: Examples of non-nested temporal layer prediction structures

FIG. 3: Example of nested temporal layer prediction structure

FIG. 4: Syntax modification for temporal level nesting in SVC's Sequence Parameter Set

400

G.7.3.2 Sequence parameter set SVC extension syntax

| seq_parameter_set_svc_extension( ) { | C | Descriptor |
|---|---|---|
|   temporal_level_nesting_flag | 0 | u(1) |
|   extended_spatial_scalability | 0 | U(2) |
|   if ( chroma_format_idc > 0 ) { | | |
|     chroma_phase_x_plus1 | 0 | U(2) |
|     chroma_phase_y_plus1 | 0 | U(2) |
|   } | | |
|   if( extended_spatial_scalability == 1 ) { | | |
|     scaled_base_left_offset | 0 | se(v) |
|     scaled_base_top_offset | 0 | se(v) |
|     scaled_base_right_offset | 0 | se(v) |
|     scaled_base_bottom_offset | 0 | se(v) |
|   } | | |
|   fgs_coding_mode | 2 | u(1) |
|   if( fgs_coding_mode == 0 ) { | | |
|     groupingSizeMinus1 | 2 | ue(v) |
|   } else { | | |
|     numPosVector = 0 | | |
|     do { | | |
|       if( numPosVector == 0 ) { | | |
|         scanIndex0 | 2 | ue(v) |
|       } | | |
|       else { | | |
|         deltaScanIndexMinus1[numPosVector] | 2 | ue(v) |
|       } | | |
|       numPosVector ++ | | |
|     } while( scanPosVectLuma[ numPosVector − 1 ] < 15 ) | | |
|   } | | |
| } | | |

FIG. 5: Syntax modification for temporal level nesting in SVC's Scalability Information SEI message

500

G.10.1.1. Scalability information SEI message syntax

| scalability_info( payloadSize ) { | C | Descriptor |
|---|---|---|
| temporal_level_nesting_flag | 0 | u(1) |
| num_layers_minus1 | 5 | ue(v) |
| for ( i = 0; i <= num_layers_minus1; i++ ) { | | |
|    layer_id[ i ] | 5 | u(8) |
|    simple_priority_id[ i ] | 5 | u(6) |
|    discardable_flag[ i ] | 5 | u(1) |
|    temporal_level[ i ] | 5 | u(3) |
|    dependency_id[ i ] | 5 | u(3) |
|    quality_level[ i ] | 5 | u(2) |
| ... | | |

FIG. 6: Processing Unit (Encoder/Server, Gateway, or Receiver)

FIG. 7: NAL Filtering Unit Operation

SYSTEMS AND METHODS FOR SIGNALING AND PERFORMING TEMPORAL LEVEL SWITCHING IN SCALABLE VIDEO CODING

CROSS-REFERENCE TO RELATED APPLICATIONS

This application is a continuation of U.S. application Ser. No. 14/072,638, filed Nov. 5, 2013, which is a continuation of U.S. application Ser. No. 11/871,612, filed Oct. 7, 2007, which claims the benefit of U.S. provisional patent application Ser. No. 60/829,609 filed Oct. 16, 2006, and is a continuation-in-part of international patent application Nos. PCT/US06/28365, filed Jul. 21, 2006, PCT/US06/28366, filed Jul. 21, 2006, PCT/US06/61815, filed Dec. 8, 2006, PCT/US06/62569, filed Dec. 22, 2006, PCT/US07/80089, filed Oct. 1, 2007, PCT/US07/62357, filed Feb. 16, 2007, PCT/US07/65554, filed Mar. 29, 2007, PCT/US07/65003, filed Mar. 27, 2007, PCT/US06/28367, Jul. 21, 2006, and PCT/US07/63335, filed May 3, 2007. All of the aforementioned applications, which are commonly assigned, are hereby incorporated by reference herein in their entireties.

FIELD OF THE INVENTION

The present invention relates to video communication systems. In particular, the invention relates to communication systems that use temporally scalable video coding and in which a receiver or intermediate gateway switches from one temporal level to a higher or lower level to meet frame rate, bit rate, processing power, or other system requirements.

BACKGROUND OF THE INVENTION

New digital video and audio 'scalable' coding techniques, which aim to generally improve coding efficiency, have a number of new structural characteristics (e.g., scalability). In scalable coding, an original or source signal is represented using two or more hierarchically structured bitstreams. The hierarchical structure implies that decoding of a given bitstream depends on the availability of some or all other bitstreams that are lower in hierarchy. Each bitstream, together with the bitstreams it depends on, offer a representation of the original signal at a particular temporal, fidelity (e.g., in terms of signal-to-noise ratio (SNR)), or spatial resolution (for video).

It is understood that term 'scalable' does not refer to a numerical magnitude or scale, but refers to the ability of the encoding technique to offer a set of different bitstreams corresponding to efficient representations of the original or source signal at different 'scales' of resolutions or other signal qualities. The ITU-T H.264 Annex G specification, which is referred to as Scalable Video Coding (SVC), is an example of a video coding standard that offers video coding scalability in all of temporal, spatial, and fidelity dimensions. SVC is an extension of the H.264 standard (also known as Advanced Video Coding or AVC). An example of an earlier standard, which also offered all three types of scalability, is ISO MPEG-2 (also published as ITU-T H.262). ITU G.729.1 (also known as G.729EV) is an example of a standard offering scalable audio coding.

The concept of scalability was introduced in video and audio coding as a solution to distribution problems in streaming and broadcasting, and to allow a given communication system to operate with varying access networks (e.g., clients connected with different bandwidths), under varying network conditions (e.g., bandwidth fluctuations), and with various client devices (e.g., a personal computer that uses a large monitor vs. a handheld device with a much smaller screen).

Scalable video coding techniques, which are specifically designed for interactive video communication applications such as videoconferencing, are described in commonly assigned International patent application PCT/US06/028365. Further, commonly assigned International patent application PCT/US06/028365 describes the design of a new type of server called the Scalable Video Communication Server (SVCS), SVCS can advantageously use scalable coded video for high-quality and low-delay video communication and has a complexity, which is significantly reduced compared to traditional switching or transcoding Multipoint Control Units (MCUs). Similarly, commonly assigned International patent application PCT/US06/62569 describes a Compositing Scalable Video Coding Server (CSVCS), which has the same benefits as an SVCS but produces a single coded output bit stream. Furthermore, International patent application PCT/US07/80089 describes a Multicast Scalable Video Coding Server (MSVCS), which has the same benefits as an SVCS but utilizes available multicast communication channels. The scalable video coding design and the SVCS/CSVCS architecture can be used in further advantageous ways, which are described, for example, in commonly assigned International patent applications PCT/US06/028367, PCT/US06/027368, PCT/US06/061815, PCT/US07/62357, and PCT/US07/63335. These applications describe the use of scalable coding techniques and SVCS/CVCS architecture for effective trunking between servers, reduced jitter buffer delay, error resilience and random access, "thinning" of scalable video bitstreams to improve coding efficiency with reduced packet loss, and rate control, respectively. Further, commonly assigned International patent application PCT/US07/65554 describes techniques for transcoding between scalable video coding formats and other formats.

Consideration is now being given to further improving video communication systems that use scalable video coding. In such systems, a source may be a transmitting endpoint that encodes and transmits live video over a communication network, a streaming server that transmits pre-coded video, or a software module that provides access to a file stored in a mass storage or other access device. Similarly, a receiver may be a receiving endpoint that obtains the coded video or audio bit stream over a communication network, or directly from a mass storage or other access device. An intermediate processing entity in the system may be an SVCS or a CSVCS. Attention is being directed toward improving the efficiency of switching between temporal layers by receivers and intermediate processing entities.

SUMMARY OF THE INVENTION

Systems and methods for signaling and temporal level switching in scalable video communication systems are provided. The systems and methods involve signaling select information, which enables temporal level switching in both lower and higher levels can be performed at arbitrary picture positions. The information is communicated as certain constraints in the temporal prediction structure of the underlying video codec. The information can be used in intermediate processing systems as well as receivers in order to adapt to different system resources (e.g., frame rate, bit rate, processing power).

Throughout the figures the same reference numerals and characters, unless otherwise stated, are used to denote like features, elements, components or portions of the illustrated embodiments. Moreover, while the present invention will now be described in detail with reference to the figures, it is done so in connection with the illustrative embodiments.

DETAILED DESCRIPTION OF THE INVENTION

Systems and methods for "switching" signals in communication systems, which use scalable coding, are provided. The switching systems and methods are designed for communication systems with temporal scalability.

Figure 1:
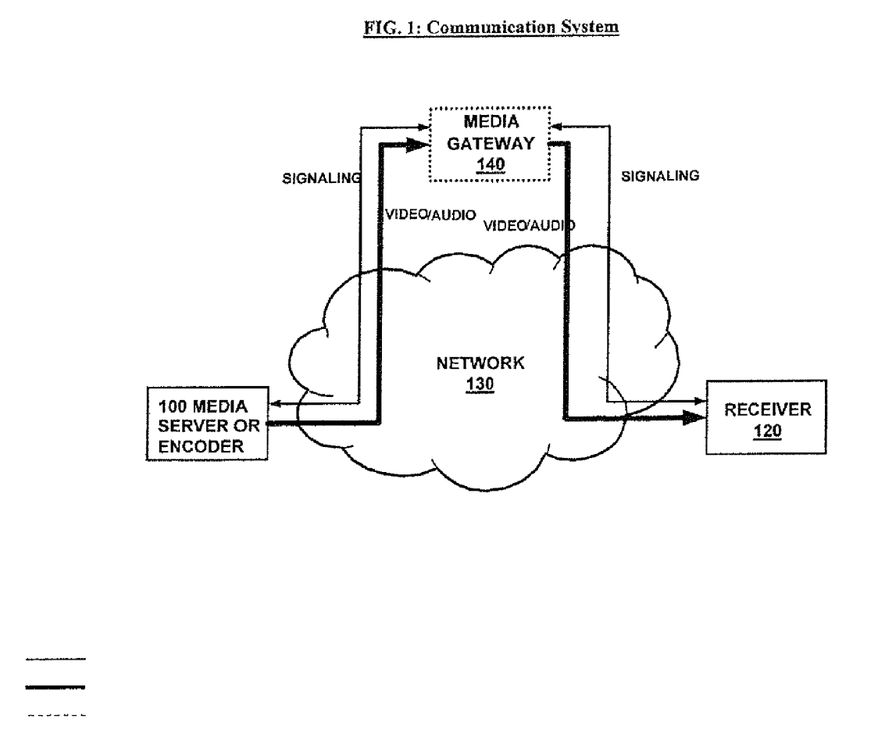
FIG. 1 is a schematic illustration of an exemplary architecture of a communication system, in accordance with the principles of the present invention.

FIG. 1 shows an exemplary architecture of a communication system 100, which uses scalable coding. Communication system 100 includes a media server or encoder 110 (e.g., a streaming server or a transmitting endpoint), which communicates video and/or audio signals with a client/receiver 120 over a network 130 through a media gateway 140.

The inventive "switching" systems and methods are described herein using communication system 100 as an example. For brevity, the description herein is limited to the video portion of communication system 100. It will be understood, however, that switching systems and methods also can be used for the scalable audio portions, with the understanding that no spatial scalability dimension can be provided to an audio signal, but multi-channel coding may additionally be used in audio signal coding. Further the systems and methods describe herein also can be used for other multimedia data (e.g., graphics) which are coded in a scalable fashion.

In a preferred embodiment of communication system 100, H.264 SVC coding format ('SVC') is used for video communication. (See, e.g., the SVC JD7 specification, T. Wiegand, G. Sullivan, J. Reichel, H. Schwarz, M. Wien, eds., "Joint Draft 7: Scalable Video Coding," Joint Video Team, Doc. JVT-T201, Klagenfurt, July 2006, which is incorporated by reference herein in its entirety). SVC is the scalable video coding extension (Annex G) of the H.264 AVC video coding standard. The base layer of an SVC stream by design is compliant to the AVC specification.

An SVC coded bitstream can be structured into several components or layers. A base layer offers a representation of the source signal at some basic fidelity dimension or level. Additional layers (enhancement layers) provide information for improved representation of the signal in the additional scalability dimensions above the basic fidelity dimension. SVC offers considerable flexibility in creating bitstream structures with scalability in several dimensions, namely spatial, temporal, and fidelity or quality dimensions. It is noted that the AVC standard already supports temporal scalability through its use of reference picture lists and associated reference picture list reordering commands.

It is further noted that the layers in the coded bitstream are typically formed in a pyramidal structure, in which the decoding of a layer may require the presence of one or more lower layers. Usually, the base layer is required for decoding of any of the enhancement layers in the pyramidal structure. However, all scalable encoding techniques do not have a pyramidal structure of the layers. For example, when scalability is provided through multiple description coding or simulcasting, independent decoding of some or all layers may be possible. Specifically for SVC, it is possible to effectively implement simulcasting by turning all inter-layer prediction modes in the encoder off. The switching systems and methods described herein are applicable to all scalability formats including both pyramidal and non-pyramidal structures.

Scalability has features for addressing several system-level challenges, such as heterogeneous networks and/or clients, time-varying network performance, best-effort network delivery, etc. In order to be able to effectively use the scalability features, however, it is desirable that they are made accessible to system components in addition to the video encoder and decoder.

As previously noted, the switching systems and methods of the present invention are directed toward communication systems having temporal scalability (e.g., system 100). It is noted that use of media gateway 140 in system 100 is optional. The switching systems and methods of the present invention are also applicable when instead of media gateway 140 a direct media server-to-client connection is used, or when the media server is replaced by a file that is directly accessible to the client on a mass storage or other access device, either directly or indirectly (e.g., a file access through a communication network). It is further noted that the systems and methods of the present invention remain the same when more than one media gateway 140 is present in the path from the media server or encoder to the receiver.

With renewed reference to FIG. 1, consider a simple operational scenario in which media server/encoder 110 (e.g., a streaming server or encoder a transmitting endpoint encoder) communicates scalable media with client/receiver 120 through media gateway 140. This simple scenario requires that a connection be made between the media server and the client for transmitting an agreed-upon set of layers, which may, for example, be Remote Transport Protocol (RTP) encapsulated SVC Network Adaptation Layer (NAL) units. Furthermore, media gateway 140 has to be instructed, or has to decide on its own, how to best operationally utilize the incoming packets (e.g., the transmitted RTP-encapsulated SVC NAL units). In the case where media gateway 140 has an SVCS/CSVCS architecture, this operational decision corresponds to a decision on which packets to drop and which to forward. Further, for proper decoder operation, client/receiver 120 must know or be able to deduce which set of layers it is supposed to receive through media gateway 140.

To enable these operations, system 100 must represent and communicate the scalability structure of the transmitted bit stream to the various system components. As an illustrative example, consider a video signal with two temporal resolutions, 15 and 30 fps, and two spatial resolutions, QCIF and CIF. Thus, the video signal has a four-layer scalability structure: layer L0 containing the QCIF signal at 15 fps; layer L1 containing the QCIF signal enhancement for 30 fps; layer S0 containing the CIF signal enhancement for 15 fps; and layer S1 containing the CIF signal enhancement for 30 fps. The coding dependency in the four-layer scalability structure may, for example, be such that L0 is the base layer, L1 depends on L0, S0 depends on L0, and S1 depends on both L1 and S0. System 100 must describe this four-layer structure to the system components so that they can properly process the video signal.

Supplemental Enhancement Information (SET) messages, are data structures contained in an SVC bitstream that provide ancillary information about the coded video signal but are not necessary for the operation of the decoding process. SVC offers a mechanism for describing the scalability structure of an SVC coded video bitstream through its "Scalability Information" SEI message (SSEI). The SSEI in Section G.10.1.1 of the SVC JD7 specification is designed to enable capability negotiation (e.g., during a connection setup), stream adaptation (by video server or intermediate media gateways), and low-complexity processing (e.g., without inference based on detailed bitstream parsing).

The SSEI, defined in Section G.10.1.1 of the SVC JD7 specification, includes descriptive information about each layer (e.g., frame rate, profile information), and importantly, coding dependency information (i.e., which other layers a given layer depends on for proper decoding). Each layer is identified, within the scope of the bitstream, by a unique 'layer id'. The coding dependency information for a particular layer is communicated by encoding the number of directly dependent layers (num_directly_dependent_layers), and a series of difference values (directly_dependent_layer_id_delta), which when added to the particular layer's layer id identify the layer id's of the layers that the particular layer depends on for decoding.

Additionally, the "Scalability Information Layers Not Present" SEI message (SSEI-LNP) defined in G.10.1.2, and the "Scalability Information Dependency Change" SEI message (SSEI-DC) defined in G.10.1.3 provide for in-band our out-of-band signaling of dynamic changes in the transmitted bitstream, respectively. The former indicates which layers, comparing with the initial SSEI, are not present in the bitstream from the point it is received, whereas the latter indicates inter-layer prediction dependency changes in the bitstream. International Patent Application No. PCT/US07/065003 describes these as well as additional systems and methods for managing scalability information.

Generally, the designs of the SSEI, SSEI-LNP, and SSEI-DC messages are such that when used in combination, the messages allow intermediate gateways or receivers to be continually informed about the overall structure of the bitstream transmitted from a server/encoder or gateway and to perform correct adaptation functions. There are, however, important limitations in the designs, which become apparent upon close examination of different possible coding structures that may be used in real communication systems.

For example, the SVC JD7 draft allows temporal structures, which contradict the pyramidal structure on which layering is being built, and which can be problematic in real applications. Specifically, the only limitation that the SVC JD7 imposes on temporal levels is the following: "The decoding of any access unit with temporal_level equal to currTl shall be independent of all access units with temporal_level greater than currTl." (See G.7.4.1, NAL unit SVC header extension semantics, p. 405). This limitation ensures that a given temporal level can be decoded without access to information from higher temporal levels. It does not address, however, any dependencies that may exist within the particular temporal level as well as between the same and lower temporal levels. The SVC JD7 limitation ensures that a transition from a higher temporal level to a lower temporal level can be made immediately by simply discarding all access units with a higher temporal level. The reverse operation, i.e., switching or transitioning from a lower temporal level to a higher temporal level, has a dependency problem.

Figure 2A:
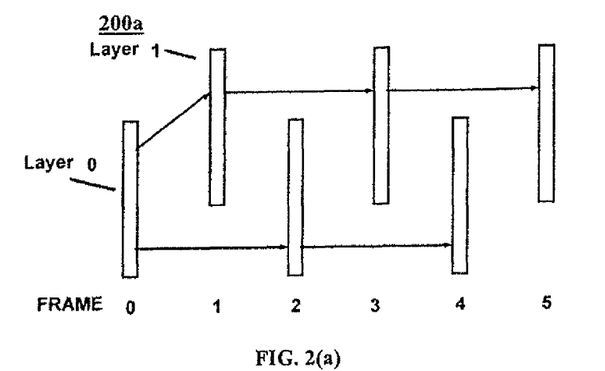
FIGS. 2a-2c are schematic illustrations of examples of non-nested temporal layer prediction structures, in accordance with the principles of the present invention.
Figure 2B:
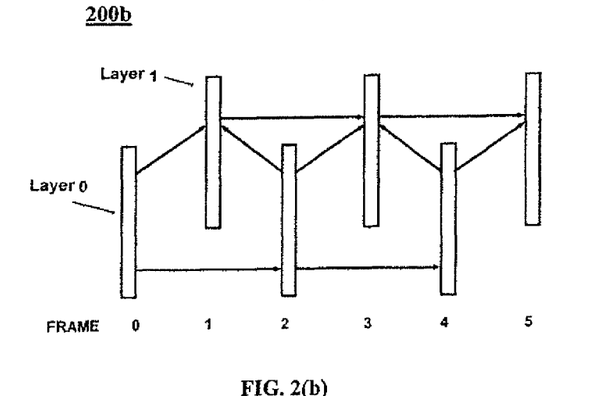

The problem can be understood with reference to FIGS. 2a and 2b, which show exemplary temporal layer picture prediction structures. FIGS. 2(a) shows a "temporally non-nested" structure 200a with two temporal layers, Layer 0 and Layer 1. The second layer (Layer 1) is formed as a completely separate "thread" that originates in the first frame (Layer 0). Since decoding of Layer 0 does not depend on Layer 1, this is a valid structure for SVC under the SVC TD7 draft. The problem transitioning from a lower temporal level to a higher temporal level with this structure is apparent for a receiver that receives only Layer 0 (at frames 0, 2, 4, etc.). The receiver cannot add Layer 1 at will because the temporal extent of the dependency of Layer 1 from Layer 0 crosses over frames of Layer 0. If, for example, the receiver wishes to add Layer 1 at frame 2, it cannot do so by starting the decoding operation (for Layer 1) at the next frame (frame 3), since such decoding operation requires both frames 0 and 1, the latter of which was not received.

FIG. 2(b) shows a similar temporally non-nested structure 200b, with a slightly more complicated coding structure of Layers 0 and 1. A receiver/decoder cannot switch to Layer 1 at frame 2, since frame 3 is predicted from frame 1.

Figure 2C:
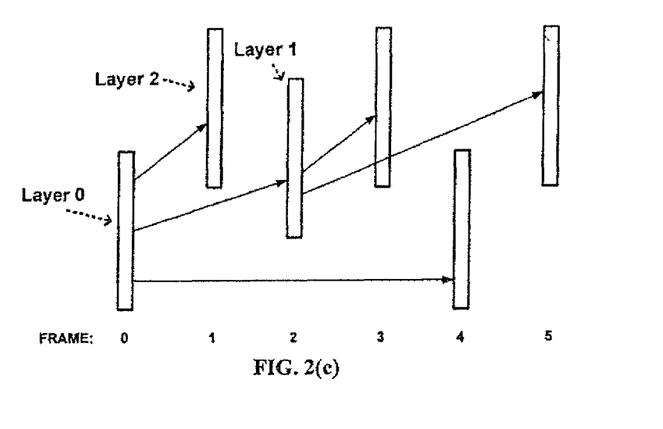

FIGS. 2a and 2b illustrate the problem of transitioning from a lower temporal level to a higher temporal level using structures 200 and 202b, which for simplicity have only two layers each. It will be understood that the problem may exist with any number of temporal layers. FIG. 2c shows an exemplary structure 200c with three temporal layers, Layers 0-2. Structure 200c presents a similar transitioning problem because of the temporal extent of the layer dependencies.

Figure 3:
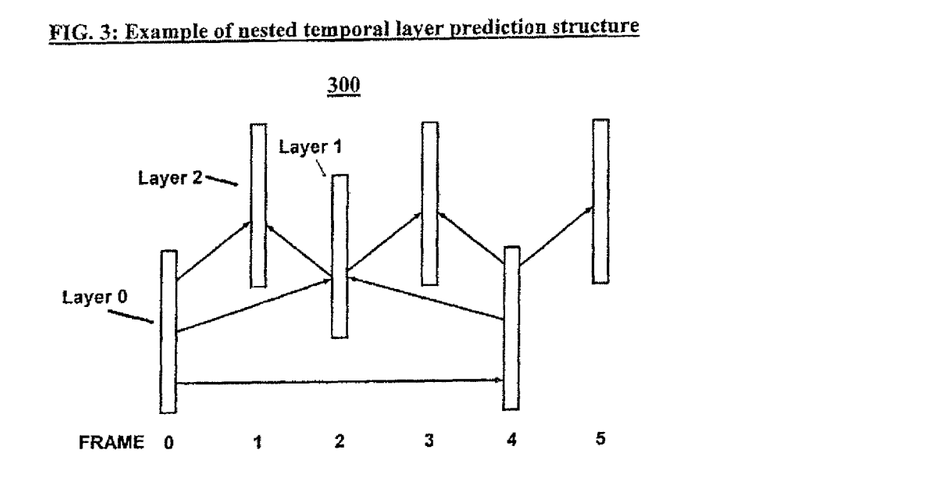
FIG. 3 is a schematic illustration of an example of a nested temporal layer prediction structure, in accordance with the principles of the present invention.

It is noted temporally non-nested layer structures 200a-200c satisfy the requirements of G.7.4.1, however, the use of the temporal scalability feature is seriously limited. In contrast, FIG. 3 shows a "temporally nested" layer structure 300, which satisfies the requirements of G.7.4.1 and also allows temporal switching from any layer to another. As shown in the figure, there is no instance of temporal nesting in structure 300: for any frame i of layer N, there is no frame of a temporal level M<N that is inbetween frame i and any of its reference pictures in decoding order. Equivalently, no reference picture is used for inter prediction when a succeeding reference picture in decoding order has a lower temporal level value. This condition ensures that additional temporal layers to layer N can be added immediately after any frame of layer N.

The ability to easily add or remove temporal levels at the encoder/server, an intermediate gateway, or a receiver, is of fundamental importance in real-time, low-delay communications, as frame rate is one of the parameters that are directly available for rate bit rate and error control. It is noted that the exemplary temporal prediction structures described in International Patent Application Nos. PCT/US06/28365, PCT/US06/028366, PCT/US06/061815, and PCT/US07/63335 are all nested. While the coding dependency information is explicitly encoded in the SSEI (and SSEI-DC), it does not capture the temporal extent of the dependency. For example, structures 200c and 300 have identical SSEI messages.

The systems and methods of the present invention include explicit information in the coded bitstream that (a) indicates the temporal extent of the dependency of temporal levels, and (b) provides the ability to enforce nested operation for specific application domains and profiles.

In one embodiment of the invention, the information consists of single-bit flag, called "temporal_level_nesting_flag," which is placed in SVC's Sequence Parameter Set.

Figure 4:
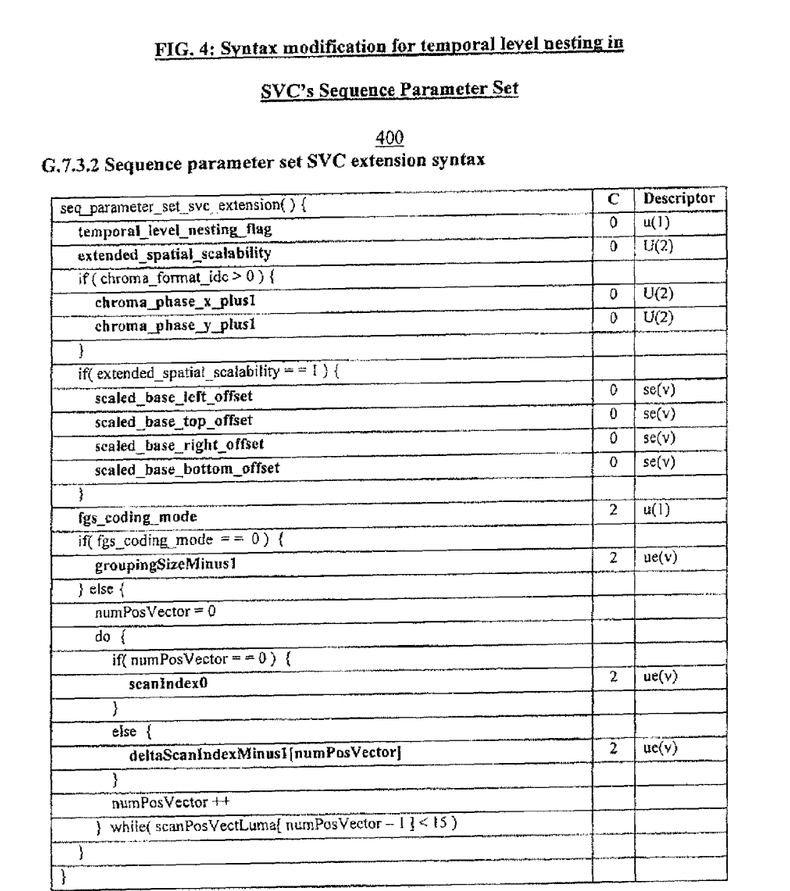
FIG. 4 is an illustration of exemplary syntax modifications for temporal level nesting in SVC's Sequence Parameter Set, in accordance with the principles of the present invention.

FIG. 4 shows modified syntax 400 for the relevant section of the JD7 text (Section G.7.3.2, Sequence parameter set SVC syntax) in accordance with the principles of the present invention. The added flag (temporal_level_nesting_flag) is the first one in the syntax structure. The semantics of the temporal_level_nesting_flag (to be placed in G.7.4.2, Sequence parameter set SVC extension semantics in the JD7 text) are defined so that a value of 0 indicates that a reference picture shall not be used for inter prediction if a succeeding reference picture in decoding order has a lower temporal level value, whereas a value of 1 indicates that no such restriction is placed. Alternative definitions of the semantics are also possible, without changing the limitation that it places on the structure of the bitstream.

Figure 5:
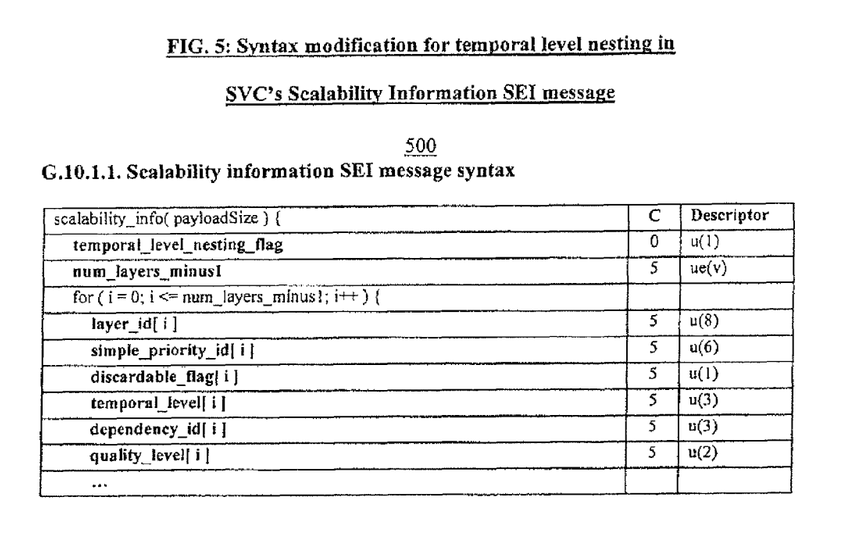
FIG. 5 is an illustration of exemplary syntax modifications for temporal level nesting in SVC's Scalability Information SEI message, in accordance with the principles of the present invention.

In a second embodiment of the invention, the same temporal_level_nesting_flag is placed in the SSEI (SVC JD7, Section G.10.1.1), which has the additional benefit that all scalability information pertaining to a particular SVC bitstream is present in a single syntax structure. FIG. 5 shows modified syntax 500 for this case. The semantics for modified syntax 500 are identical to the semantics applicable to syntax 400.

The use of the temporal level nesting flag by a media server or encoder, media gateway, or receiver/decoder involves the same operations irrespective of whether the temporal_level_nesting_flag is present in the SSEI or the Sequence Parameter Set. Since the operation is the same in both cases for all devices, for convenience, all three different types of devices are referred to herein commonly as "Processing Units".

Figure 6:
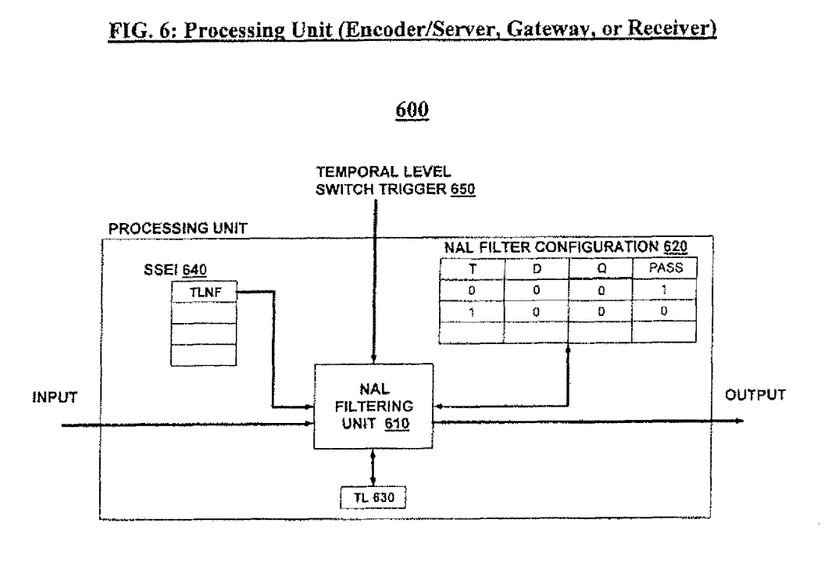
FIG. 6 is a schematic illustration of an exemplary architecture of a processing unit (encoder/server, gateway, or receiver), in accordance with the principles of the present invention.

FIG. 6 shows the architecture of an exemplary Processing Unit 600, as it relates to NAL filtering. Processing Unit 600 accepts SVC NAL units at each input, and produces copies of some or all of the input NAL units at its output. The decision on which NAL units to forward to the output is performed at the NAL Filtering Unit 610. In a preferred architecture, NAL Filtering Unit 610 is controlled by a NAL Filter Configuration (NFC) table 620, which may be stored in RAM. NFC 620 is a three-dimensional table, where the three dimensions T, D, and Q correspond to the temporal_level, dependency_id, and quality_id of a NAL. In FIG. 6, the table value is shown in the PASS column. A value of 1 in a table entry with particular T, D, and Q values indicates that NAL Filtering Unit 610 should forward an input NAL unit that has the same T, D, and Q values in its SVC header. Conversely, a value of 0 indicates that it should not forward the particular input NAL unit. Thus, according to NFC 620 shown in FIG. 6 the base layer (T=0, D=0, Q=0) is allowed to be forwarded to the output, but the higher temporal layer (T=1) is not.

During set up, Processing Unit 600 obtains the SSEI, either in-band (from the SVC bitstream), through signaling, or other means. The SSEI is stored in RAM 640 to be used for later operations. NFC 620 may obtain its initial configuration after the SSEI is obtained. The initial configuration may be, for example, such that all NAL units are passed on to the output (no filtering is applied). This is dependent on the specific application. Processing Unit 600 also sets an initial value to the TL memory 630, which stores the current operating temporal level.

As shown in FIG. 6, Processing Unit 600 is also equipped with an additional input, Temporal Level Switch Trigger 650. This input provides information to NAL Filtering Unit 610 on the desired temporal level of system operation. Temporal Level Switch Trigger 650 signal may, for example, have positive, zero, or negative integer values, indicating that after the current picture the temporal level should be increased, stay the same, or be reduced, respectively, by the indicated amount.

When NAL Filtering Unit 610 detects a negative value of Temporal Level Switch Trigger signal at a particular picture, it adds this value to the current operating temporal level value stored in TL memory 630 and reconfigures the NFC table 620 to reflect the desired new operating temporal level. If the addition results in a negative value, a value of 0 is stored in TL memory 630. When NAL Filtering Unit 610 detects a positive Temporal Level Switch Trigger signal at a particular picture, it first checks the value of the temporal_level_nesting_flag. If the value is 0, then NAL Filtering Unit 610 cannot decide, in the absence of additional application-specific information, if it is possible to switch to the desired higher temporal level and no action is taken. If the value of temporal_level_nesting_flag is 1, then the value of the Temporal Level Switch Trigger signal is added to the TL memory, and the NFC table is reconfigured to reflect the desired new operating level. If the new value of the TL memory is higher than the maximum temporal level present in the bitstream, as reflected in the SSEI, then the TL is set to that maximum temporal level value. It is noted that the maximum temporal level value can be obtained from the SSEI by parsing all the layer information contained in the SSEI, and storing the largest value of the temporal_level[i] syntax element.

Figure 7:
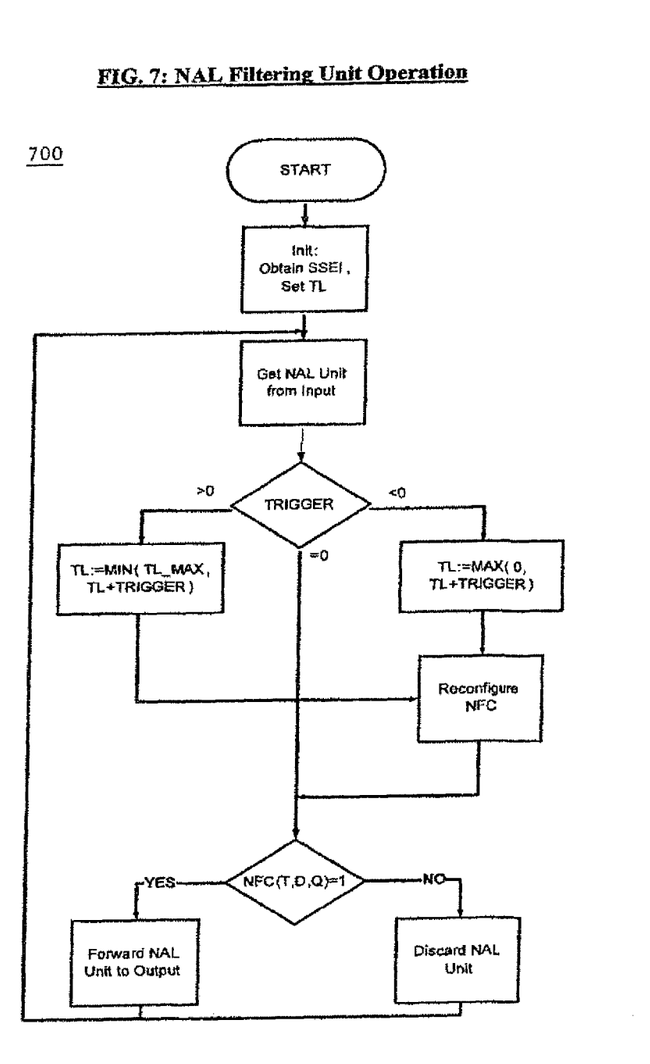
FIG. 7 is a flow diagram illustrating an exemplary operation of an NAL Filtering Unit, in accordance with the principles of the present invention.

FIG. 7 shows a flow diagram 700 of the operation of NAL Filtering Unit 610. In flow diagram 700, the legend 'TRIGGER' designates the value of Temporal Level Switch Trigger 650 signal of FIG. 6, while 'TL_MAX' designates the maximum temporal level value as obtained from the SSEI. Function NFC (T, D, Q) returns the value of NFC 620 for the particular combination of T, D, and Q values.

It is noted that in systems where all components are purposefully designed together, it may be possible to make a priori assumptions about the structure of the bitstream. In these cases, temporal level upswitching may be possible if certain criteria are satisfied by the T, D, and Q values. NAL Filtering Unit 610 may be configured to incorporate such criteria when attempting to perform temporal level upswitching, and to also elect to perform the temporal level upswitching at a later picture, where presumably the application-specific conditions will be satisfied.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

It will be understood that in accordance with the present invention, the techniques described herein may be implemented using any suitable combination of hardware and software. The software (i.e., instructions) for implementing and operating the aforementioned rate estimation and control techniques can be provided on computer-readable media, which can include without limitation, firmware, memory, storage devices, microcontrollers, microprocessors, integrated circuits, ASICs, on-line downloadable media, and other available media.

The invention claimed is:

1. A method for decoding media encoded using scalable coding with temporal scalability at a pre-determined maximum temporal level, the method comprising:

receiving signaling information that is indicative of a temporally nested structure of layers and pertains to all frames of a coded video sequence; and decoding with a decoding device those parts of the encoded media signal which correspond to temporal levels that are less than or equal to the maximum temporal level, wherein the signaling information indicates for any three frames picA, picB, picC included in the coded video sequence, that picB is not used for reference of picA:

under a first condition that picB is of a temporal level lower or equal than the temporal level of picA, and under a second condition that the temporal level of picC is lower than the temporal level of picB, and under a third condition that picC follows picB in decoding order, and under a fourth condition that picC precedes picA in decoding order.

2. A non-transitory computer readable medium comprising a set of executable instructions to direct a processor to perform the method recited in claim 1.

3. A decoding device configured to perform the method in claim 1.

4. A method for decoding media encoded using scalable coding with temporal scalability at a pre-determined maximum temporal level, the method comprising:

receiving signaling information that is indicative of a temporally nested structure of layers and pertains to a plurality of frames, and decoding with a decoding device those parts of the encoded media signal which correspond to temporal levels that are less than or equal to the maximum temporal level, wherein the scalable coding complies with H.264/SVC, and wherein the signaling information indicates for any three frames picA, picB, picC included in the coded video sequence, that picB is not used for reference of picA:

under a first condition that picB is of a temporal level lower or equal than the temporal level of picA, and under a second condition that the temporal level of picC is lower than the temporal level of picB, and under a third condition that picC follows picB in decoding order, and under a fourth condition that picC precedes picA in decoding order.

5. A non-transitory computer readable medium comprising a set of executable instructions to direct a processor to perform the method recited in claim 4.

6. A decoding device configured to perform the method in claim 4.

* * * * *